United States Patent
Hatano (10) Patent No.: US 12,196,142 B2
(45) Date of Patent: Jan. 14, 2025

(54) DELAY TIME CALCULATION METHOD AND GAS TURBINE CONTROL METHOD, AND DELAY TIME CALCULATION APPARATUS AND CONTROL APPARATUS FOR GAS TURBINE

(71) Applicant: MITSUBISHI HEAVY INDUSTRIES, LTD., Tokyo (JP)

(72) Inventor: Ken Hatano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/490,361

(22) Filed: Oct. 19, 2023

(65) Prior Publication Data

US 2024/0151186 A1    May 9, 2024

(30) Foreign Application Priority Data

Nov. 7, 2022 (JP) ................. 2022-177819

(51) Int. Cl.
  *F02C 9/26* (2006.01)
  *F23N 1/00* (2006.01)
  *G01K 17/00* (2006.01)

(52) U.S. Cl.
  CPC ............. *F02C 9/26* (2013.01); *F23N 1/002* (2013.01); *G01K 17/00* (2013.01); *F05D 2270/31* (2013.01); *F23N 2221/10* (2020.01)

(58) Field of Classification Search
  CPC ............. F02C 9/26; F23N 1/00; F23N 1/002; F23N 2221/10; G01K 17/00; G01K 17/06; F05D 2270/31
  See application file for complete search history.

(56) References Cited

U.S. PATENT DOCUMENTS

| | | | | | |
|---|---|---|---|---|---|
| 4,398,836 | A | * | 8/1983 | Sitek | G01N 25/26 374/38 |
| 9,745,910 | B2 | * | 8/2017 | Nakamura | F02D 41/1439 |
| 2006/0248894 | A1 | | 11/2006 | Hiramoto et al. | |
| 2010/0173253 | A1 | * | 7/2010 | Mohr | F02C 9/28 431/12 |

FOREIGN PATENT DOCUMENTS

| JP | 2004-190632 | 7/2004 |
|---|---|---|
| JP | 2006-233920 | 9/2006 |
| JP | 2014-156825 | 8/2014 |
| JP | 2014-194175 | 10/2014 |

\* cited by examiner

*Primary Examiner* — Steven M Sutherland
(74) *Attorney, Agent, or Firm* — Wenderoth, Lind & Ponack, L.L.P.

(57) ABSTRACT

A delay time calculation method includes: a step of calculating a plurality of segment movement delay times respectively indicating times required for the fuel gas to pass through a plurality of segments; a step of calculating a total movement delay time which is a time required for the fuel gas to move through the fuel line from the measurement point to the supply target device, by adding up the plurality of segment movement delay times; and a step of acquiring the delay time based on the total movement delay time. The step of calculating the plurality of segment movement delay times includes acquiring the segment movement delay time based on a correlation between the segment movement delay time acquired in advance and a fuel flow rate supplied to the supply target device, for each of the plurality of segments.

8 Claims, 8 Drawing Sheets

FIG. 10

DELAY TIME CALCULATION METHOD AND GAS TURBINE CONTROL METHOD, AND DELAY TIME CALCULATION APPARATUS AND CONTROL APPARATUS FOR GAS TURBINE

TECHNICAL FIELD

The present disclosure relates to a delay time calculation method and a gas turbine control method, and a delay time calculation apparatus and a control apparatus for gas turbine. This application claims the priority of Japanese Patent Application No. 2022-177819 filed on Nov. 7, 2022, the content of which is incorporated herein by reference.

BACKGROUND

The calorie (amount of heat) per unit weight of a fuel gas supplied to a supply target device (for example, a combustor of a gas turbine) may fluctuate according to time, and the calorie is normally measured at a position upstream of the supply target device disposed in a fuel line for supplying the fuel gas to the supply target device. That is, the fuel gas normally reaches the supply target device with a delay from when the calorie is measured. Therefore, in control of a facility (for example, a gas turbine) including the supply target device, a delay time indicating a time difference between when the calorie of the fuel gas is measured and when the fuel gas reaches the supply target device may be taken into consideration.

For example, Patent Document 1 discloses a power generation plant that includes a gas turbine including a combustor to which a fuel gas is supplied via a fuel line, and a generator driven by the gas turbine. In this power generation plant, in order to suppress fluctuations in generator output caused by calorie fluctuations in fuel gas, the opening degree of a fuel gas flow control valve is adjusted in consideration of a delay time from when a calorimeter installed in the fuel line detects the calorie fluctuations in fuel gas until the fluctuations appear in a detected value of an output meter of the generator.

CITATION LIST

Patent Literature

Patent Document 1: JP2014-194175A

SUMMARY

In using the delay time which indicates the time difference between when the calorie of the fuel gas is measured and when the fuel gas reaches the supply target device (such as the combustor) to control the facility (such as the gas turbine) including the supply target device, it is required to accurately calculate the delay time.

In view of the above, an object of at least one embodiment of the present invention is to provide a delay time calculation method and a gas turbine control method, and a delay time calculation apparatus and a control apparatus for gas turbine, which are capable of accurately calculating a delay time indicating a time difference between when the calorie of a fuel gas is measured and when the fuel gas reaches a supply target device.

A delay time calculation method according to at least one embodiment of the present invention is a method for calculating a delay time in a facility including a fuel line for introducing a fuel gas to a supply target device, and a calorimeter for measuring a calorie of the fuel gas obtained from a measurement point of the fuel line, the delay time indicating a time difference between when the calorie of the fuel gas is measured by the calorimeter and when the fuel gas reaches the supply target device, the fuel line including a plurality of segments obtained by dividing the fuel line between the measurement point and the supply target device, the delay time calculation method including: a step of calculating a plurality of segment movement delay times respectively indicating times required for the fuel gas to pass through the plurality of segments; a step of calculating a total movement delay time which is a time required for the fuel gas to move through the fuel line from the measurement point to the supply target device, by adding up the plurality of segment movement delay times; and a step of acquiring the delay time based on the total movement delay time. The step of calculating the plurality of segment movement delay times includes acquiring the segment movement delay time based on a correlation between the segment movement delay time acquired in advance and a fuel flow rate supplied to the supply target device, for each of the plurality of segments.

Further, a gas turbine control method according to at least one embodiment of the present invention, includes: a step of controlling a gas turbine including a combustor as the supply target device, by using the delay time calculated by the above-described delay time calculation method.

Further, a delay time calculation apparatus according to at least one embodiment of the present invention is a calculation apparatus for calculating a delay time in a facility including a fuel line for introducing a fuel gas to a supply target device, and a calorimeter for measuring a calorie of the fuel gas obtained from a measurement point of the fuel line, the delay time indicating a time difference between when the calorie of the fuel gas is measured by the calorimeter and when the fuel gas reaches the supply target device, the fuel line including a plurality of segments obtained by dividing the fuel line between the measurement point and the supply target device, the delay time calculation apparatus including: a segment movement delay time calculation unit configured to calculate a plurality of segment movement delay times respectively indicating times required for the fuel gas to pass through the plurality of segments; a total movement delay time calculation unit configured to calculate a total movement delay time by adding up the plurality of segment movement delay times; and a delay time acquisition unit configured to acquire the delay time based on the total movement delay time. The segment movement delay time calculation unit is configured to calculate the plurality of segment movement delay times includes acquiring the segment movement delay time based on a correlation between the segment movement delay time acquired in advance and a fuel flow rate supplied to the supply target device, for each of the plurality of segments.

Further, a control apparatus for a gas turbine according to at least one embodiment of the present invention, includes: the above-described delay time calculation apparatus; and a control unit configured to control a gas turbine including a combustor as the supply target device, by using the delay time calculated by the delay time calculation apparatus.

According to at least one embodiment of the present invention, a delay time calculation method and a gas turbine control method, and a delay time calculation apparatus and a control apparatus for gas turbine are provided, which are capable of accurately calculating a delay time indicating a time difference between when the calorie of a fuel gas is measured and when the fuel gas reaches a supply target device.

DETAILED DESCRIPTION

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.
(Configuration of Facility)

Figure 1:
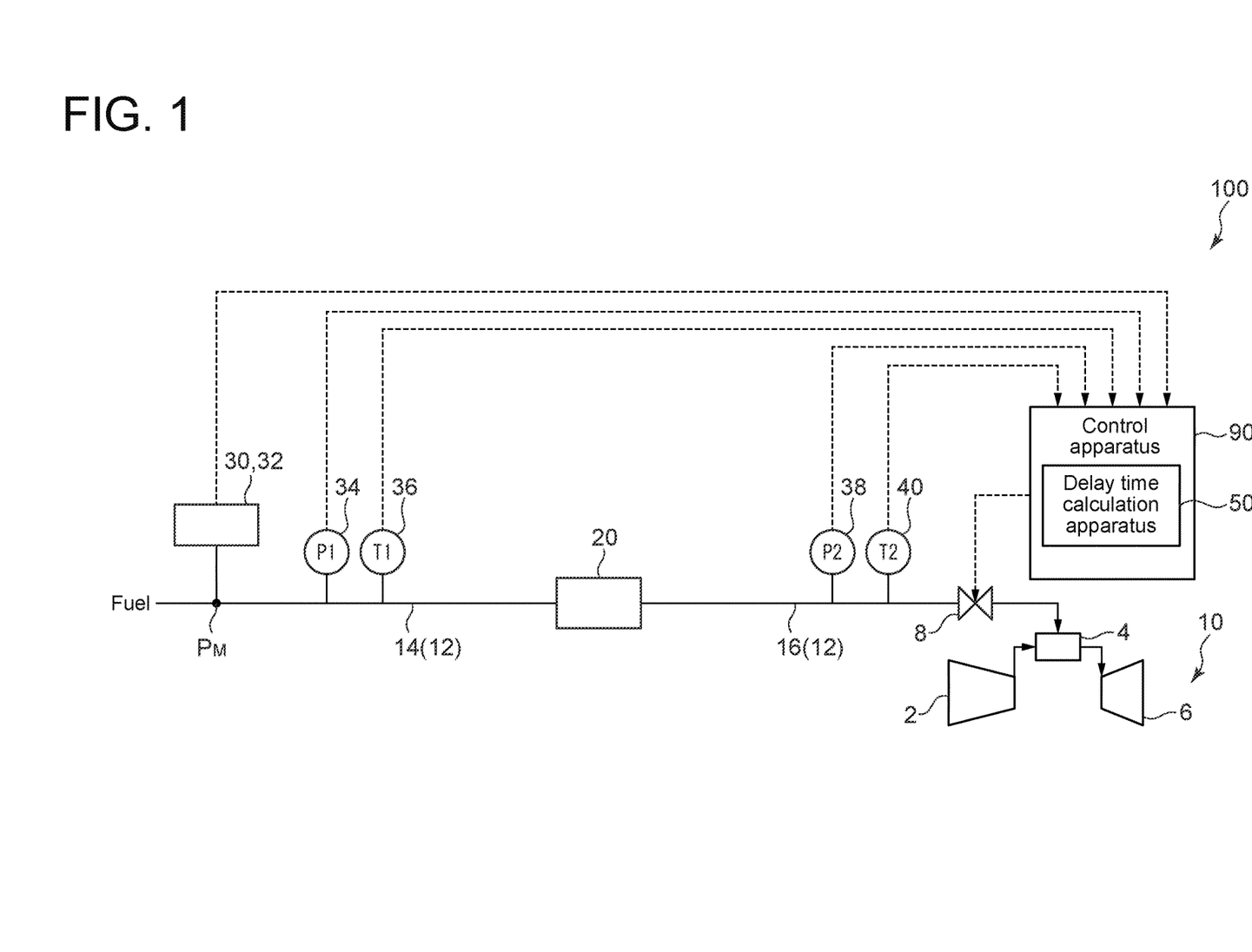
FIG. 1 is a schematic configuration diagram showing an example of a facility to which a delay time calculation method/apparatus or a control method/apparatus is applied according to an embodiment.
Figure 2:
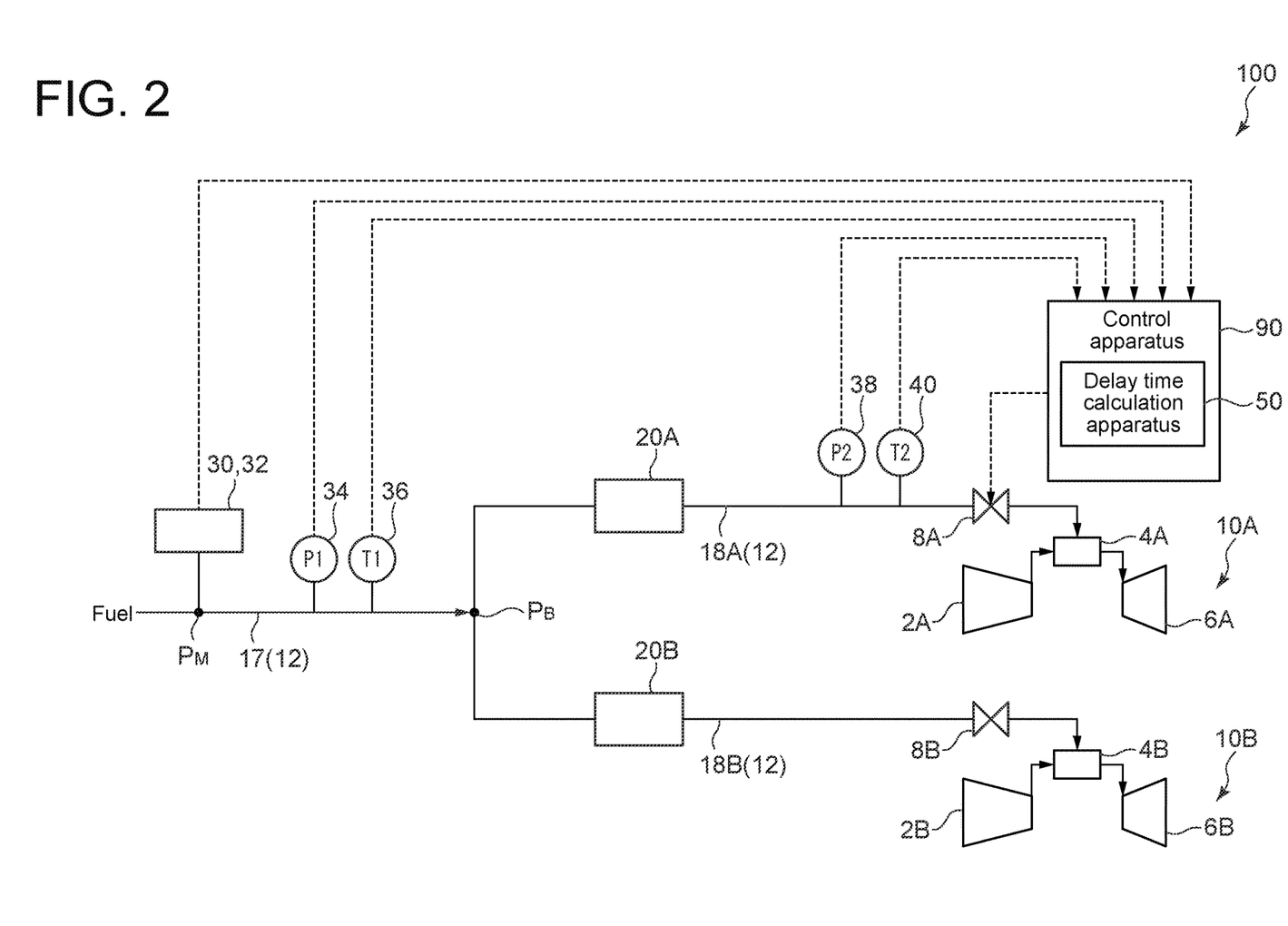
FIG. 2 is a schematic configuration diagram showing an example of the facility to which the delay time calculation method/apparatus or the control method/apparatus is applied according to an embodiment.

FIGS. 1 and 2 are, respectively, schematic configuration diagrams showing an example of a facility to which a delay time calculation method/apparatus or a control method/apparatus is applied according to some embodiments.

As shown in FIGS. 1 and 2, a facility 100 includes a fuel line 12 for introducing a fuel gas to a supply target device, and a calorimeter 30 for measuring the calorie (for example, the calorie per unit weight) of the fuel gas obtained from a measurement point $P_M$ in the fuel line 12. In the exemplary embodiments shown in FIGS. 1 and 2, the supply target device with the fuel gas includes a combustor 4 of a gas turbine 10. The supply target device is not limited to the combustor of the gas turbine, but may be, for example, a burner etc. configured to burn the fuel gas.

The gas turbine 10 includes a compressor 2 for compressing air, the combustor 4 (supply target device) configured to burn the fuel gas and generate a combustion gas by using the compressed air from the compressor 2, and a turbine 6 configured to be driven by the combustion gas from the combustor 4. The combustor 4 is supplied with the fuel gas via the fuel line 12. Further, the fuel line 12 is provided with a fuel valve 8 for adjusting a supply amount of the fuel gas (fuel flow rate) to the combustor 4. In the exemplary embodiments shown in FIGS. 1 and 2, the fuel line 12 is provided with a heater 20 for heating the fuel gas.

In the exemplary embodiment shown in FIG. 1, the fuel line 12 includes an upstream portion 14 which is a portion between the measurement point $P_M$ and the heater 20, and a downstream portion 16 which is a portion between the heater 20 and the supply target device (combustor 4). That is, the upstream portion 14 includes a section of the fuel line 12, which is upstream of the heater 20. Further, the downstream portion 16 includes a section of the fuel line 12, which is downstream of the heater 20.

In some embodiments, for example, as shown in FIG. 2, the facility 100 includes a plurality of supply target devices where the fuel gas is supplied. In the exemplary embodiment shown in FIG. 2, the plurality of supply target devices include respective combustors 4A, 4B of a plurality of gas turbines 10A, 10B. The gas turbines 10A, 10B respectively include compressors 2A, 2B, the combustors 4A, 4B (supply target devices), and turbines 6A, 6B.

In the exemplary embodiment shown in FIG. 2, the fuel line 12 includes branch lines 18A, 18B branching at a branch point $P_B$, and an upstream portion 17 upstream of the branch point $P_B$. The combustors 4A, 4B are respectively supplied with the fuel gas via the branch lines 18A, 18B. Further, the branch lines 18A, 18B are provided with fuel valves 8A, 8B for adjusting a supply amount of the fuel gas (fuel flow rate) to the combustors 4A, 4B, respectively. The branch lines 18A, 18B are respectively provided with heaters 20A, 20B for heating the fuel gas. Furthermore, the measurement point $P_M$ is located upstream of the branch point $P_B$ in the fuel line 12.

In the embodiment shown in FIG. 2, the upstream portion 17 is a portion, of the fuel line 12, between the measurement point $P_M$ and the branch point $P_B$. Further, the branch lines 18A, 18B are respectively portions, of the fuel line 12, between the branch point $P_B$ and the supply target devices (combustors 4A, 4B). That is, the upstream portion 17 is located upstream of the branch point $P_B$ in the fuel line 12, and the branch lines 18A, 18B are located downstream of the branch point $P_B$ in the fuel line 12. Further, the upstream portion 17 includes a section of the fuel line 12, which is upstream of the heaters 20A, 20B, and the branch lines 18A, 18B include sections of the fuel line 12, which are downstream of the heaters 20A, 20B.

The facility 100 may be provided with a pressure sensor or a temperature sensor for measuring a pressure or a temperature of the fuel gas in the fuel line 12.

In the exemplary embodiment shown in FIG. 1, the facility 100 is provided with a pressure sensor 34 and a temperature sensor 36 for respectively measuring the pressure and the temperature of the fuel gas in the upstream portion 14 of the fuel line 12, and is provided with a pressure sensor 38 and a temperature sensor 40 for respectively measuring the pressure and the temperature of the fuel gas in the downstream portion 16 of the fuel line 12.

In the exemplary embodiment shown in FIG. 2, the facility 100 is provided with the pressure sensor 34 and the temperature sensor 36 for respectively measuring the pressure and the temperature of the fuel gas in the upstream portion 17 of the fuel line 12, and is provided with the pressure sensor 38 and the temperature sensor 40 for respectively measuring the pressure and the temperature of the fuel gas in the branch line 18A of the fuel line 12.

The facility 100 may be provided with a density meter for measuring the density of the fuel gas. In the exemplary embodiments shown in FIGS. 1 and 2, a density meter 32 is disposed integrally with the calorimeter 30 and is configured to measure the density of the fuel gas obtained from the measurement point $P_M$.

(Configuration of Delay Time Calculation Apparatus/Control Apparatus)

A delay time calculation apparatus 50 according to some embodiments is configured to calculate a delay time in the above-described facility 100. The delay time indicates a time difference between when the calorie of the fuel gas is measured by the calorimeter 30 and when the fuel gas reaches the supply target device (the combustor 4 in the above-described embodiment).

A control apparatus 90 according to some embodiments is configured to control the facility (the gas turbine 10 in the above-described embodiment) including the above-described supply target device (the combustor 4 in the above-described embodiment), by using the delay time calculated by the delay time calculation apparatus 50.

In the exemplary embodiment shown in FIG. 2, the control target of the control apparatus 90 is the gas turbine 10A among the gas turbines 10A, 10B. Further, in the exemplary embodiment shown in FIG. 2, the delay time calculation apparatus 50 is configured to calculate the delay time indicating the time difference between when the calorie of the fuel gas is measured by the calorimeter 30 and when the fuel gas reaches the combustor 4A.

Figure 3:
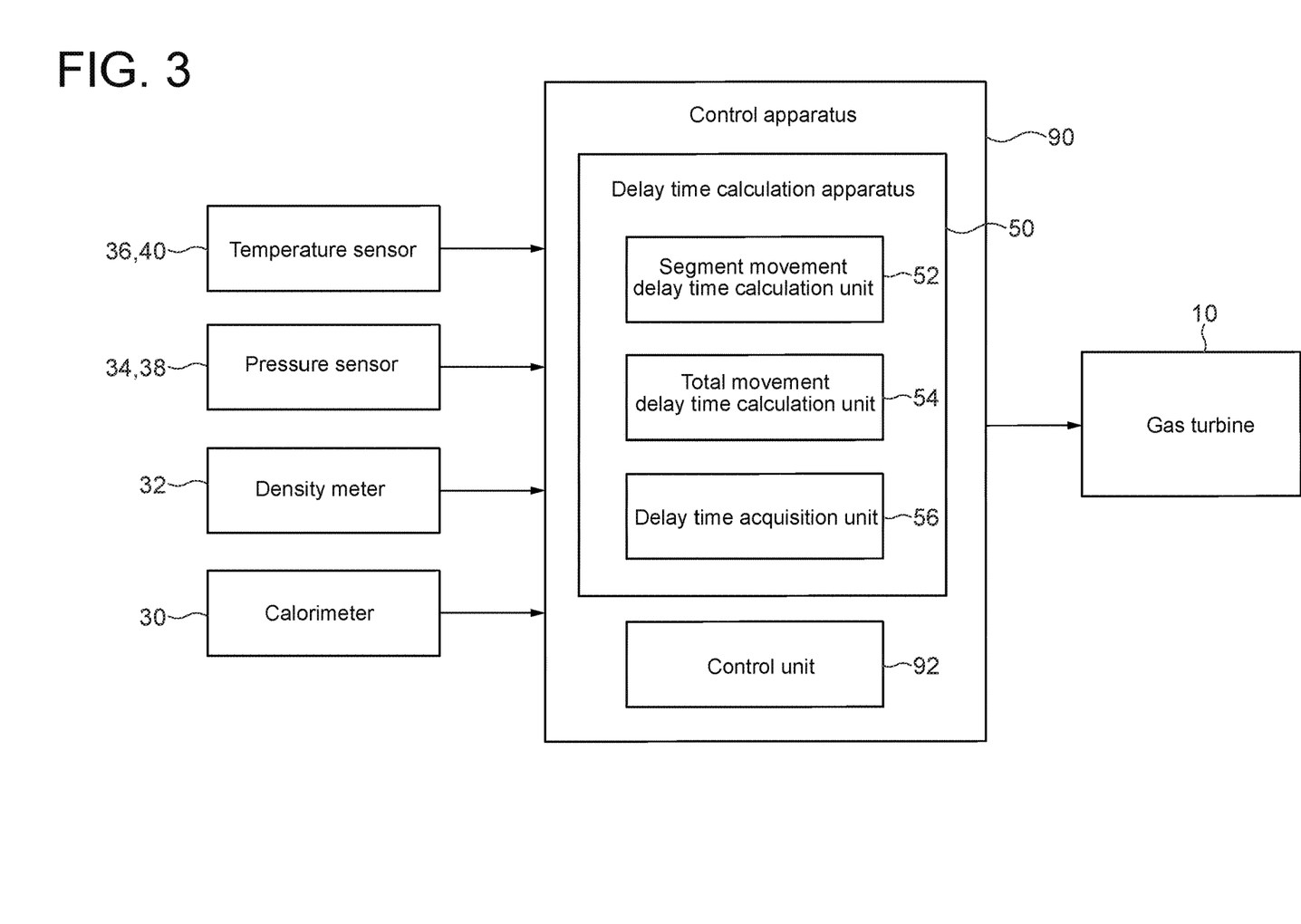
FIG. 3 is a schematic diagram showing the configuration of the delay time calculation apparatus and the control apparatus according to an embodiment.

FIG. 3 is a schematic diagram showing the configuration of the delay time calculation apparatus and the control apparatus including the same according to an embodiment. As shown in FIG. 3, the delay time calculation apparatus 50 includes a segment movement delay time calculation unit 52, a total movement delay time calculation unit 54, and a delay time acquisition unit 56. The control apparatus 90 includes a control unit 92 for controlling the gas turbine 10 by using a calculation result of the delay time calculation apparatus 50.

The delay time calculation apparatus 50 and/or the control apparatus 90 includes a calculator with a processor (such as CPU), a main storage device (memory device; such as RAM), an auxiliary storage device, an interface, and the like. The delay time calculation apparatus 50 and/or the control apparatus 90 is configured to receive, via an interface, signals indicating respective measurement values from the calorimeter 30, the temperature sensors 36, 40, the pressure sensors 34, 38, and/or the density meter 32. The processor is configured to process the signals thus received. In addition, the processor is configured to process programs loaded into the main storage device. Whereby, the functions of the segment movement delay time calculation unit 52, the total movement delay time calculation unit 54, the delay time acquisition unit 56, and/or the control unit 92 described above are realized.

The delay time calculation apparatus 50 and/or the control apparatus 90 may be implemented as programs executed by the processor. The programs may be stored in, for example, the auxiliary storage device. When executed, these programs are loaded into the main storage device. The processor reads out the programs from the main storage device to execute instructions included in the programs.

The delay time calculation apparatus 50 and the control apparatus 90 may be implemented in the same computer, or may respectively be implemented in separate computers.

Further, as shown in FIG. 3, the delay time calculation apparatus 50 may be implemented as part of the control apparatus 90.

The segment movement delay time calculation unit 52 is configured to calculate a plurality of segment movement delay times $T_D$ respectively indicating times required for the fuel gas to pass through a plurality of segments of the fuel line 12.

Herein, the plurality of segments of the fuel line 12 are a plurality of segments obtained by dividing the fuel line 12 between the measurement point $P_M$ and the supply target device (combustor 4). In the exemplary embodiment shown in FIG. 1, the plurality of segments include a first segment of the fuel line 12, which includes the upstream portion 14 and a second segment of the fuel line 12, which includes the downstream portion 16. In the exemplary embodiment shown in FIG. 2, the plurality of segments include the first segment of the fuel line 12, which includes the upstream portion 17 and the second segment of the fuel line 12, which includes the branch line 18A.

Figure 6:
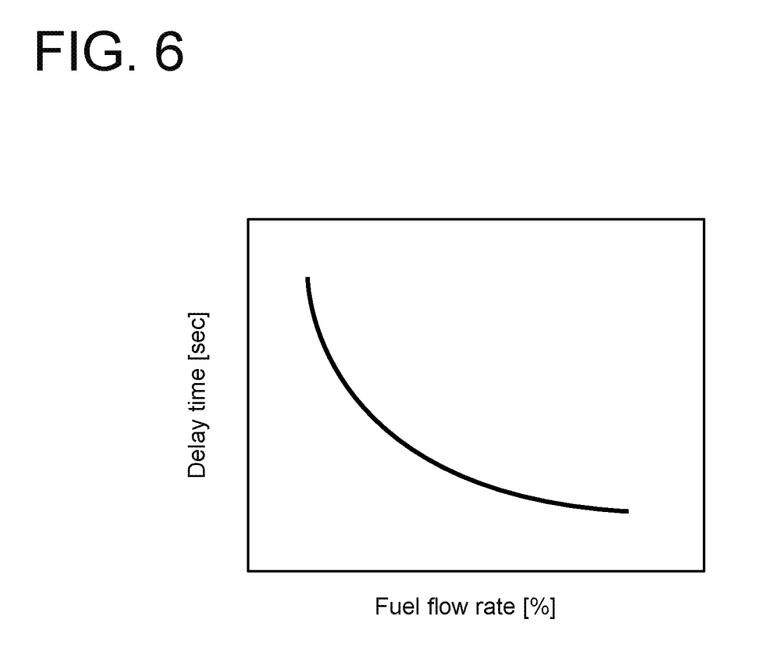
FIG. 6 is a graph showing an example of a function representing a correlation between a fuel flow rate and a segment movement delay time.

The segment movement delay time calculation unit 52 is configured to acquire the above-described segment movement delay time $T_D$ based on a correlation between the segment movement delay time $T_D$ acquired in advance and a fuel flow rate F supplied to the supply target device (combustor 4), for each of the plurality of segments (for example, the first segment and the second segment described above). The above-described correlation may be a function (for example, a function shown in FIG. 6) representing the relationship between the above-described segment movement delay time and the above-described fuel flow rate.

For example, in the case of the facility 100 having the configuration shown in FIG. 1, based on a correlation between a segment movement delay time $T_{D1}$ for the first segment (upstream portion 14) and the fuel flow rate F supplied to the combustor 4, the segment movement delay time $T_{D1}$ for the first segment may be acquired by applying to the above-described correlation the fuel flow rate F (a command value of the fuel flow rate) given to the fuel valve 8 from the control apparatus 90 etc. Further, based on a correlation between a segment movement delay time $T_{D2}$ for the second segment (downstream portion 16) and the fuel flow rate F supplied to the combustor 4, the segment movement delay time $T_{D2}$ for the second segment may be acquired by applying to the above-described correlation the fuel flow rate F (the command value of the fuel flow rate) given to the fuel valve 8 from the control apparatus 90 etc.

Moreover, for example, in the case of the facility 100 having the configuration shown in FIG. 2, based on a correlation between the segment movement delay time $T_{D1}$ for the first segment (upstream portion 17) and a total value of a fuel flow rate $F_A$ supplied to the combustor 4A and a fuel flow rate $F_B$ supplied to the combustor 4B, the segment movement delay time $T_{D1}$ for the first segment may be acquired by applying to the above-described correlation the fuel flow rate $F_A$ (a command value of the fuel flow rate) given to the fuel valve 8A and the fuel flow rate $F_B$ (a command value of the fuel flow rate) given to the fuel valve 8B from the control apparatus 90 etc. Further, based on a correlation between the segment movement delay time $T_{D2}$ for the second segment (branch line 18A) and the fuel flow rate $F_A$ supplied to the combustor 4A, the segment movement delay time $T_{D2}$ for the second segment may be acquired by applying to the above-described correlation the fuel flow rate $F_A$ (the command value of the fuel flow rate) given to the fuel valve 8A from the control apparatus 90 etc.

The correlation between the segment movement delay time for each segment and the fuel flow rate supplied to the supply target device (combustor 4) can be acquired from operation record etc. of the gas turbine 10. The correlation may be stored in advance in a storage unit (not shown), and the segment movement delay time calculation unit 52 may acquire the above-described correlation stored in the storage unit, by reading it from the storage unit.

The above-described storage unit may include the main storage device or the auxiliary storage device of the calculator forming the delay time calculation apparatus 50, or may include a storage device connected to the delay time calculation apparatus 50 via a network etc.

The segment movement delay time calculation unit 52 may correct at least one of the plurality of calculated segment movement delay times $T_D$ with the temperature or the pressure of the fuel gas in a corresponding one of the segments, and may acquire a corrected segment movement delay time $T_D^*$.

Figure 7:
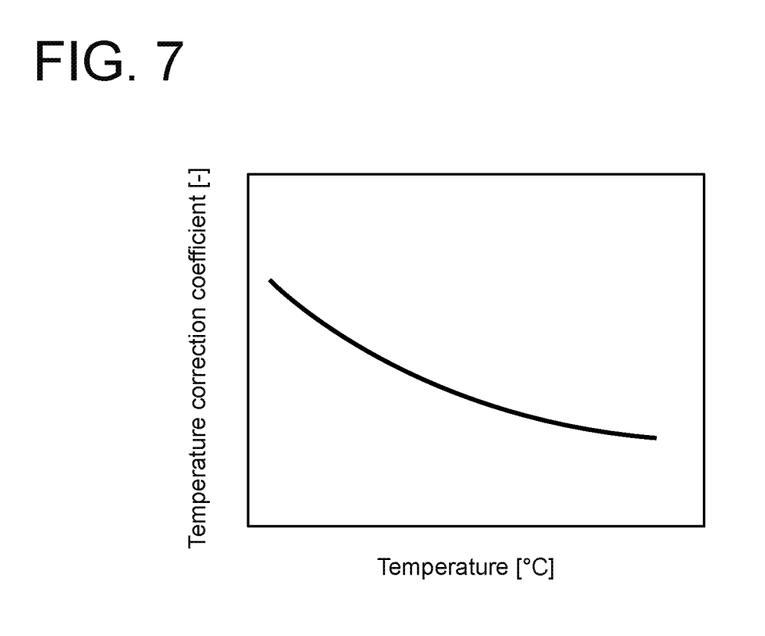
FIG. 7 is a graph showing an example of a function representing a relationship between a temperature of a fuel gas and a temperature correction coefficient in each segment.
Figure 8:
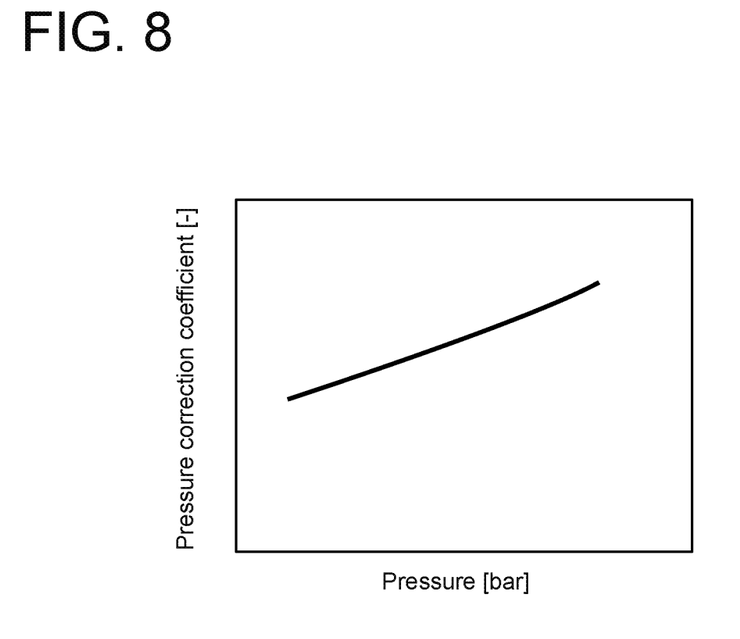
FIG. 8 is a graph showing an example of a function representing a relationship between a pressure of the fuel gas and a pressure correction coefficient in each segment.

For example, the corrected segment movement delay time $T_D^*$ may be calculated by multiplying the segment movement delay time $T_D$ by a temperature correction coefficient or a pressure correction coefficient obtained in advance for each segment. The temperature correction coefficient may be expressed as a function of the temperature of the fuel gas in each segment (for example, a function as shown in FIG. 7). The pressure correction coefficient may be expressed as a function of the pressure of the fuel gas in each segment (for example, a function as shown in FIG. 8).

In the case of the facility 100 having the configurations shown in FIGS. 1 and 2, the segment movement delay time $T_{D1}$ may be corrected by acquiring, from a function indicating a relationship between the temperature correction coefficient and the temperature of the fuel gas in the first segment (upstream portion 14, 17), a temperature correction coefficient corresponding to a temperature T1 measured by the temperature sensor 36, and by multiplying the segment movement delay time $T_{D1}$ of the first segment by the temperature correction coefficient. Further, the segment movement delay time $T_{D2}$ may be corrected by acquiring, from a function indicating a relationship between the temperature correction coefficient and the temperature of the fuel gas in the second segment (downstream portion 16 or the branch line 18A), a temperature correction coefficient corresponding to a temperature T2 measured by the temperature sensor 40, and by multiplying the segment movement delay time $T_{D2}$ of the second segment by the temperature correction coefficient.

Moreover, in the case of the facility 100 having the configurations shown in FIGS. 1 and 2, the segment movement delay time $T_{D1}$ may be corrected by acquiring, from a function indicating a relationship between the pressure correction coefficient and the pressure of the fuel gas in the first segment (upstream portion 14, 17), a pressure correction coefficient corresponding to a pressure P1 measured by the pressure sensor 34, and by multiplying the segment movement delay time $T_{D1}$ of the first segment by the pressure correction coefficient. Further, the segment movement delay time $T_{D2}$ may be corrected by acquiring, from a function indicating a relationship between the pressure correction coefficient and the pressure of the fuel gas in the second segment (downstream portion 16 or the branch line 18A), a pressure correction coefficient corresponding to a pressure P2 measured by the pressure sensor 38, and by multiplying the segment movement delay time $T_{D2}$ of the second segment by the pressure correction coefficient.

The total movement delay time calculation unit 54 is configured to calculate a total movement delay time Ttotal by adding up the plurality of segment movement delay times $T_D$ (or the corrected segment movement delay times $T_D^*$). The total movement delay time Ttotal indicates a time required for the fuel gas to move through the fuel line 12 from the measurement point $P_M$ to the supply target device (combustor 4 or 4A).

In the case of the facility 100 having the configurations shown in FIGS. 1 and 2, since the fuel line 12 between the measurement point $P_M$ and the supply target device (combustor 4 or 4A) is divided into the two segments, that is, the first segment and the second segment, the total movement delay time Ttotal is the total value of the segment movement delay time $T_{D1}$ (or the corrected segment movement delay time $T_{D1}^*$) of the first segment and the segment movement delay time $T_{D2}$ (or the corrected segment movement delay time $T_{D2}^*$) of the second segment.

The total movement delay time calculation unit 54 may correct the calculated total movement delay time Ttotal with the density of the fuel gas, and may acquire a corrected total movement delay time Ttotal*.

Figure 9:
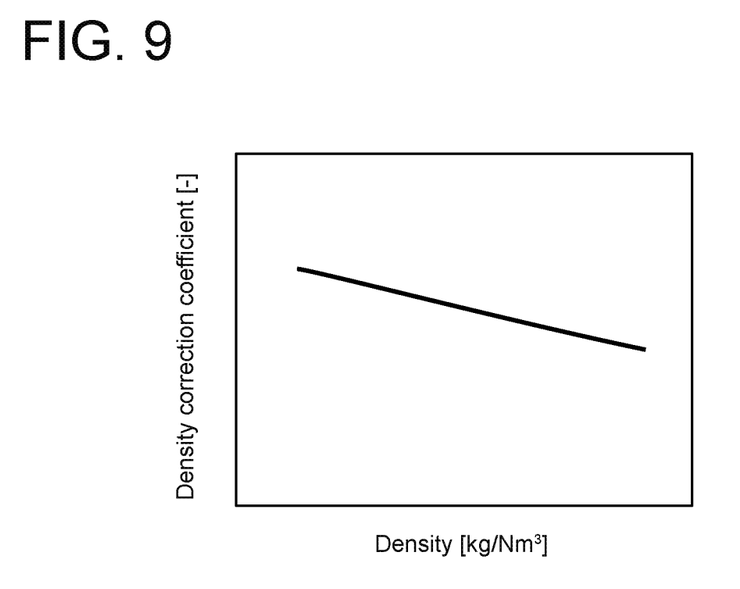
FIG. 9 is a graph showing an example of a function representing a relationship between a density of the fuel gas and a density correction coefficient.

For example, the corrected total movement delay time Ttotal* may be calculated by multiplying the total movement delay time Ttotal by a density correction coefficient obtained in advance. The density correction coefficient may be expressed as a function of the density of the fuel gas (for example, a function as shown in FIG. 9).

In the case of the facility 100 having the configurations shown in FIGS. 1 and 2, the total movement delay time Ttotal may be corrected by acquiring, from a function indicating a relationship between the density correction coefficient and the density of the fuel gas, a density correction coefficient corresponding to the density measured by the density meter 32, and by multiplying the total movement delay time Ttotal by the density correction coefficient.

In some embodiments, instead of the total movement delay time Ttotal, each of the plurality of segment movement delay times $T_D$ may be corrected with the density of the fuel gas. Then, the total movement delay time Ttotal may be calculated by adding up the plurality of segment movement delay times $T_D$ thus corrected with the density of the fuel gas.

The delay time acquisition unit 56 is configured to acquire the above-described delay time (that is, the delay time indicating the time difference between when the calorie of the fuel gas is measured by the calorimeter 30 and when the fuel gas reaches the supply target device (combustor 4, 4A)), based on the total movement delay time Ttotal (or the corrected total movement delay time Ttotal*) calculated by the total movement delay time calculation unit 54.

In some embodiments, the delay time acquisition unit 56 may acquire, as the above-described delay time, the total movement delay time Ttotal (or the corrected total movement delay time Ttotal*) itself calculated by the total movement delay time calculation unit 54.

Alternatively, in some embodiments, the delay time acquisition unit 56 may acquire, as the above-described delay time, a delay time $T_{NET}$ obtained by subtracting a time required to measure the calorie of the fuel gas (calorimeter detection delay $T_M$) from the total movement delay time Ttotal (or the corrected total movement delay time Ttotal*) calculated by the total movement delay time calculation unit 54.

The time required for the calorie measurement by the calorimeter 30 (calorimeter detection delay $T_M$) may be a total value of a time until the fuel gas to be measured is introduced into the calorimeter 30 from the measurement point $P_M$ of the fuel line 12 (that is, a time required for tubing) and a time required to measure the calorie of the fuel gas after the fuel gas to be measured is introduced into the calorimeter 30.

An actual value acquired in advance may be used as the time required for calorie measurement by the calorimeter 30 (calorimeter detection delay $T_M$). The actual value may be stored in advance in the above-described storage unit.

Figure 10:
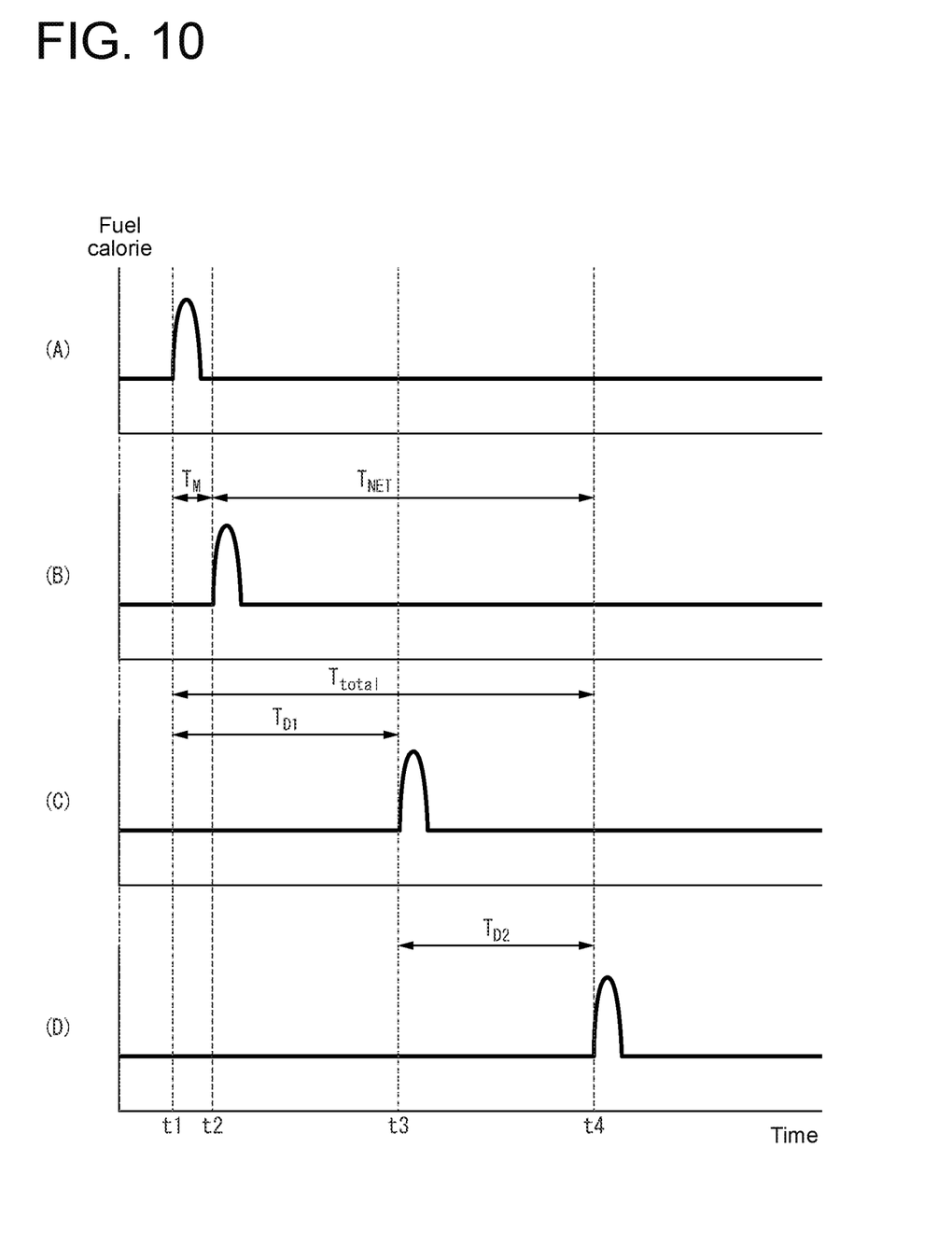
FIG. 10 shows graphs for visually describing a delay time calculated with the delay time calculation apparatus according to an embodiment.

FIG. 10 shows graphs for visually describing the delay time calculated with the above-described delay time calculation apparatus 50. Graphs shown in (A) to (D) of FIG. 10 respectively show time changes in fuel gas calorie at specific locations in the facility 100. Specifically, the graph of (A) shows the time change in calorie of the fuel gas at the measurement point $P_M$ in the fuel line 12, the graph of (B) shows the time change in calorie measurement value of the fuel gas by the calorimeter 30, the graph of (C) shows the time change in calorie of the fuel gas at a boundary between the first segment and the second segment (the heater 20 in FIG. 1 or the branch point $P_B$ in FIG. 2), and the graph of (D) shows the time change in calorie of the fuel gas at the position of the fuel valve 8 (combustor 4). The graphs in FIG. 10 are to emphatically show the calorie change of the fuel gas for the sake of explanation, and may differ greatly from an actual calorie change of the fuel gas.

Assume that the calorie of the fuel gas flowing through the fuel line 12 changes at the measurement point $P_M$ at time t1 as shown in (A) of FIG. 10. In this case, in the calorimeter 30, the above-described calorie change of the fuel gas is detected at time t2 after the time t1 by the calorimeter detection delay $T_M$, as shown in (B) of FIG. 10. Further, at the boundary between the first segment and the second segment, the above-described calorie change of the fuel gas appears at time t3 after the time t1 by the segment movement delay time $T_{D1}$ of the first segment (that is, the time in which the fuel gas moves through the fuel line 12 from the measurement point $P_M$ to the boundary between the first segment and the second segment), as shown in (C) of FIG. 10. Furthermore, in the fuel valve 8 (combustor 4), the above-described calorie change of the fuel gas appears at time t4 after the time t3 by the segment movement delay time $T_{D2}$ of the second segment (that is, the time in which the fuel gas moves through the fuel line 12 from the first segment and the second segment to the fuel valve 8 (combustor 4)), as shown in (D) of FIG. 10.

Therefore, the time difference (delay time) exists between when the calorie change of the fuel gas flowing through the fuel line 12 is detected by the calorimeter 30 at the time t2 and when the fuel gas reaches the control target device (gas turbine 10) at the time t4. Therefore, in order to appropriately control the gas turbine etc., it is required to accurately calculate the delay time.

The control unit 92 is configured to control the gas turbine 10 including the combustor 4 (supply target device), by using the delay time acquired by the delay time acquisition unit 56 (that is, the delay time calculated by the delay time calculation apparatus 50). The control unit 92 may be configured to generate a control signal for controlling the gas turbine 10, by using the delay time.

The control unit 92 may calculate an index indicating a turbine inlet temperature of the gas turbine 10 at each time, by using the above-described delay time and the calorie measurement value by the calorimeter 30, and may be configured to control the gas turbine 10 by using the index.

The control unit 92 may be configured to control the opening degree of the fuel valve 8, 8A or control the opening degree of an inlet guide vane of the compressor 2, 2A, by using, for example, the above-described delay time, the calorie measurement value by the calorimeter 30, and/or the index calculated using the delay time (for example, an index indicating a turbine inlet temperature).

In the delay time calculation apparatus 50 having the above-described configuration, the fuel line 12 is divided into the plurality of segments (the first segment and the second segment), and for each of the plurality of segments, the segment movement delay time $T_D$ according to the fuel flow rate F supplied to the supply target device (combustor 4) can appropriately be calculated based on the correlation between the fuel flow rate F and the movement delay time (segment movement delay time $T_D$) of the fuel gas. Further, in the delay time calculation apparatus 50 having the above-described configuration, since the fuel line 12 is divided into the plurality of segments (the first segment and the second segment) and the movement delay time (segment movement delay time $T_D$) of the fuel gas is calculated for each of the plurality of segments, it is possible to respectively calculate the plurality of segment movement delay times $T_D$ by taking into account conditions (for example, the temperature or the pressure of the fuel gas, the fuel flow rate to the supply target device, or the like) which are different depending on the segments. Therefore, the total movement delay time Ttotal required for the fuel gas to move through the fuel line 12 from the calorie measurement point $P_M$ to the supply target device (combustor 4) can accurately be calculated by adding up the plurality of segment movement delay times $T_D$ thus obtained. Therefore, the control apparatus 90 can more appropriately control the gas turbine 10 including the supply target device (combustor 4), by using the delay time based on the total movement delay time Ttotal.

(Calculation Flow of Delay Time)

The delay time calculation method according to some embodiments will be described with reference to FIGS. 4 and 5. Hereinafter, a method for calculating the delay time in the facility 100 having the configurations shown in FIGS. 1 and 2, by using the above-described delay time calculation apparatus 50 will be described. In some embodiments, however, the above-described delay time may be calculated by using another apparatus. Further, part or the whole of the method described below may be performed manually.

Figure 4:
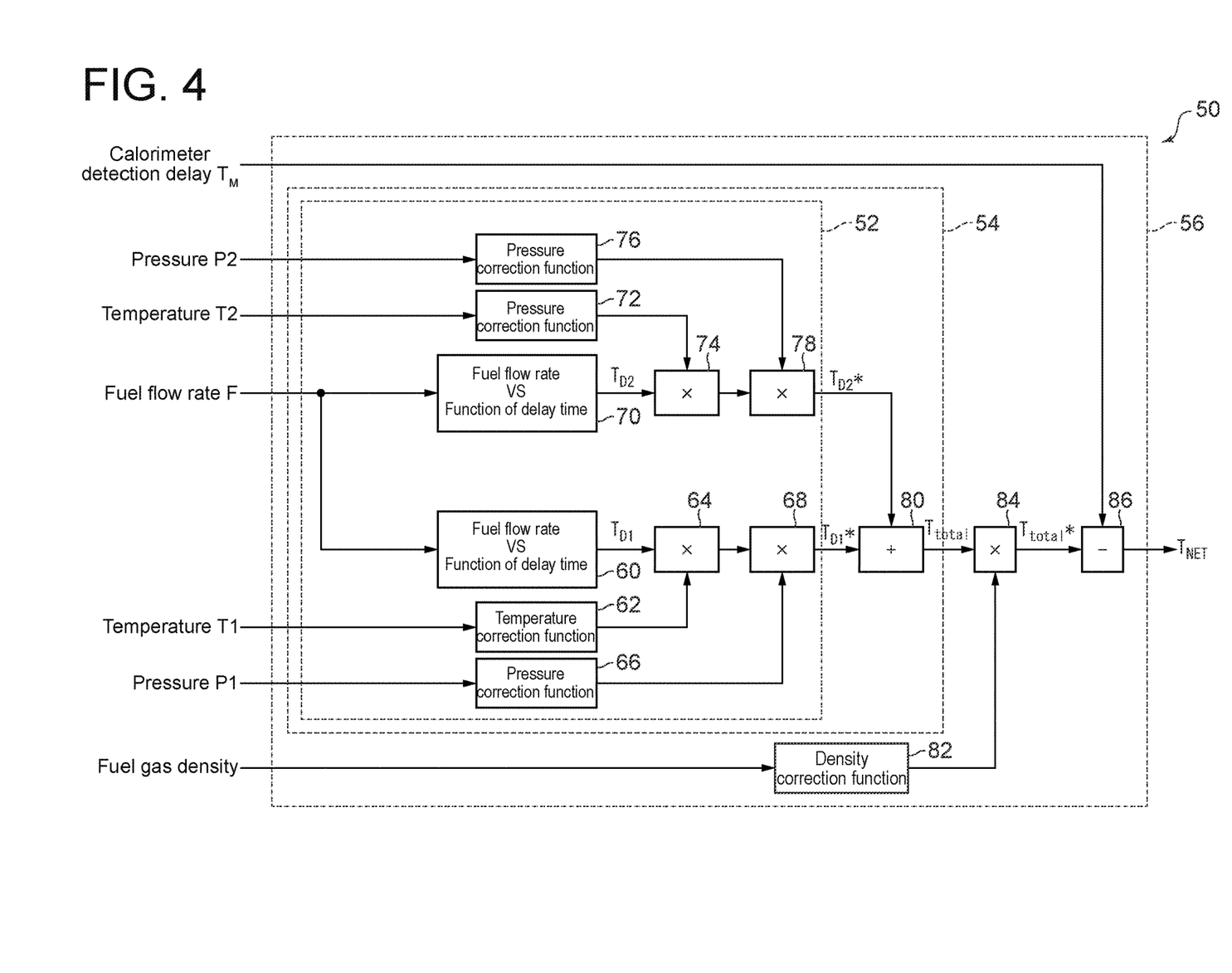
FIG. 4 is a block diagram of the delay time calculation apparatus according to an embodiment.

FIG. 4 is a block diagram of the delay time calculation apparatus 50 according to an embodiment. Herein, the flow of calculating by the delay time calculation apparatus 50 the delay time in the facility 100 having the configuration shown in FIG. 1 will be described.

As shown in FIG. 4, first, in the segment movement delay time calculation unit 52, the segment movement delay time $T_{D1}$ in the first segment (upstream portion 14) of the fuel line 12, which corresponds to the fuel flow rate F (the command value of the fuel flow rate given to the fuel valve 8) acquired from the control apparatus 90 etc., is calculated by applying the acquired fuel flow rate F to a function 60 representing a correlation between the fuel flow rate F and the segment movement delay time $T_{D1}$ in the first segment.

A temperature correction coefficient obtained by applying the temperature T1 (that is, the temperature T1 acquired by the temperature sensor 36) of the fuel gas in the first segment of the fuel line 12 to a temperature correction function 62 is input to a multiplier 64, and the multiplier 64 calculates the product of the segment movement delay time $T_{D1}$ and the temperature correction coefficient. That is, in the multiplier 64, the segment movement delay time $T_{D1}$ is corrected with the temperature T1 of the fuel gas in the first segment. The calculation result in the multiplier 64 is input to a multiplier 68.

A pressure correction coefficient obtained by applying the pressure P1 (that is, the pressure P1 acquired by the pressure sensor 34) of the fuel gas in the first segment of the fuel line 12 to a pressure correction function 66 is input to the multiplier 68, and the multiplier 68 calculates the product of the calculation result in the multiplier 64 and the pressure correction coefficient. That is, in the multiplier 68, the segment movement delay time $T_{D1}$ is corrected with the pressure P1 of the fuel gas in the first segment. The calculation result in the multiplier 68 is the segment movement delay time $T_{D1}*$ corrected with the temperature T1 and the pressure P1 of the fuel gas in the first segment.

Further, in the segment movement delay time calculation unit 52, the segment movement delay time $T_{D2}$ in the second segment (downstream portion 16) of the fuel line 12, which corresponds to the fuel flow rate F (the command value of the fuel flow rate given to the fuel valve 8) acquired from the control apparatus 90 etc., is calculated by applying the acquired fuel flow rate F to a function 70 representing a correlation between the fuel flow rate F and the segment movement delay time $T_{D2}$ in the second segment.

A temperature correction coefficient obtained by applying the temperature T2 (that is, the temperature T2 acquired by the temperature sensor 40) of the fuel gas in the second segment of the fuel line 12 to a temperature correction function 72 is input to a multiplier 74, and the multiplier 74 calculates the product of the segment movement delay time $T_{D2}$ and the temperature correction coefficient. That is, in the multiplier 74, the segment movement delay time $T_{D2}$ is corrected with the temperature T2 of the fuel gas in the second segment. The calculation result in the multiplier 74 is input to a multiplier 78.

A pressure correction coefficient obtained by applying the pressure P2 (that is, the pressure P2 acquired by the pressure sensor 38) of the fuel gas in the second segment of the fuel line 12 to a pressure correction function 76 is input to the multiplier 78, and the multiplier 78 calculates the product of the calculation result in the multiplier 74 and the pressure correction coefficient. That is, in the multiplier 78, the segment movement delay time $T_{D2}$ is corrected with the pressure P2 of the fuel gas in the second segment. The calculation result in the multiplier 78 is the segment movement delay time $T_{D2}*$ corrected with the temperature T2 and the pressure P2 of the fuel gas in the second segment.

The segment movement delay time $T_{D1}*$ of the first segment and the segment movement delay time $T_{D2}*$ of the second segment calculated by the segment movement delay time calculation unit 52 as described above are input to an adder 80, and the both are added up in the adder 80 to calculate the total movement delay time Ttotal. The calculated total movement delay time Ttotal is input to a multiplier 84.

A density correction coefficient obtained by applying the density of the fuel gas, which is obtained from the density meter 32, to a density correction function 82 is input to a multiplier 84, and the multiplier 84 calculates the product of the total movement delay time Ttotal and the density correction coefficient. That is, the multiplier 84 calculates the total movement delay time Ttotal* obtained by correcting the total movement delay time Ttotal with the density of the fuel gas. The calculated (that is, corrected) total movement delay time Ttotal* is input to a subtracter 86.

The calorimeter detection delay $T_M$ acquired from the storage unit etc. is input to the subtracter 86, and the subtracter 86 subtracts the calorimeter detection delay $T_M$ from the total movement delay time Ttotal*, calculating the delay time $T_{NET}$ indicating the time difference between when the calorie of the fuel gas is measured by the calorimeter 30 and when the fuel gas reaches the supply target device (combustor 4).

The delay time $T_{NET}$ thus calculated may be input to the above-described control unit 92 and used to generate the control signal for controlling the gas turbine 10.

Figure 5:
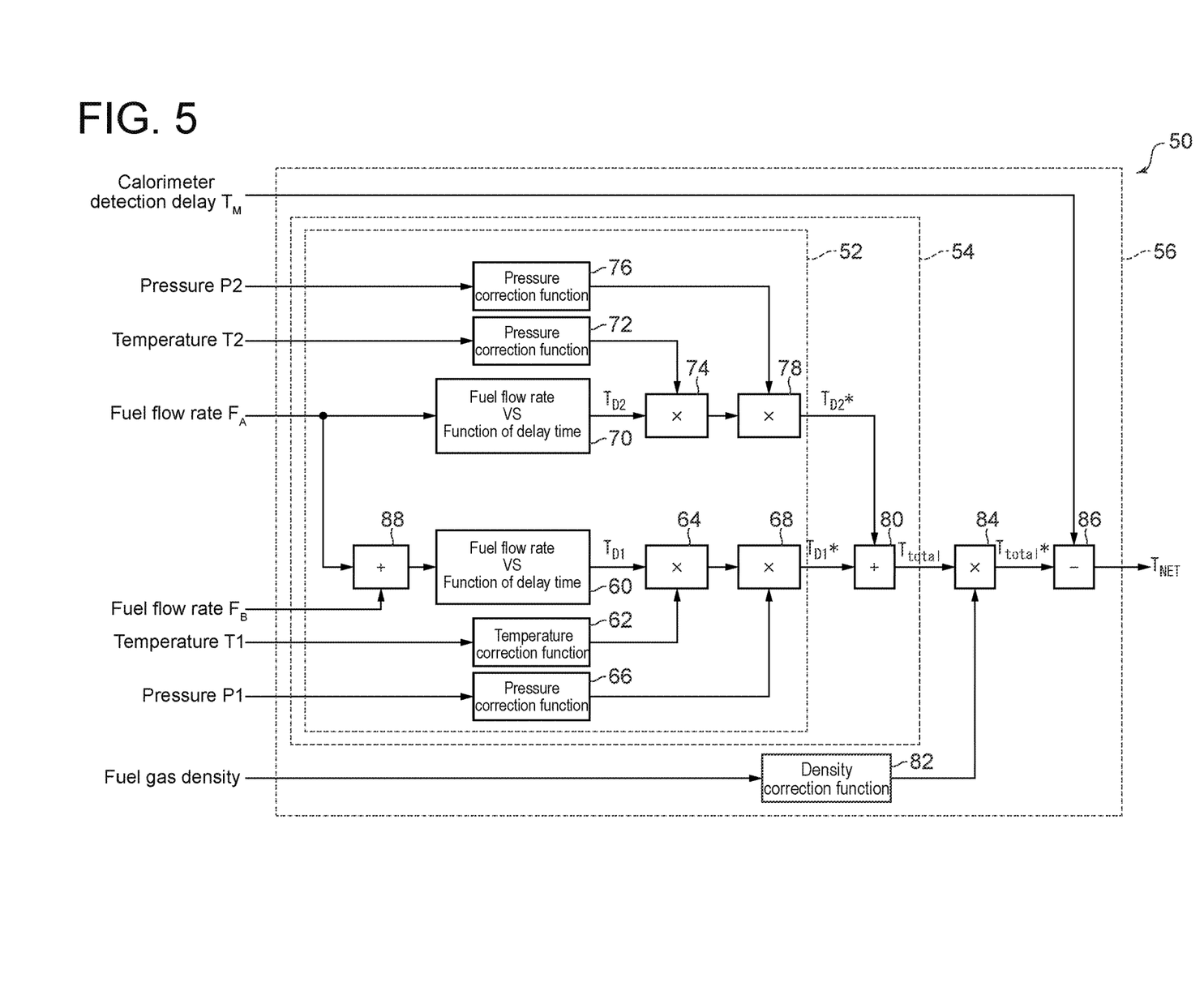
FIG. 5 is a block diagram of the delay time calculation apparatus according to an embodiment.

FIG. 5 is a block diagram of the delay time calculation apparatus 50 according to an embodiment. Herein, the flow of calculating by the delay time calculation apparatus 50 the delay time in the facility 100 having the configuration shown in FIG. 2 will be described.

As shown in FIG. 5, first, the adder 88 of the segment movement delay time calculation unit 52 receives the fuel flow rate $F_A$ (the command value of the fuel flow rate given to the fuel valve 8A) and the fuel flow rate $F_B$ (the command value of the fuel flow rate given to the fuel valve 8B) acquired from the control apparatus 90 etc., and calculates the sum of the both. The segment movement delay time $T_{D1}$ in the first segment (upstream portion 17) of the fuel line 12, which corresponds to the acquired sum of the fuel flow rates $F_A$ and $F_B$, is calculated by applying the calculation result (the sum of the fuel flow rates $F_A$ and $F_B$) in the adder 88 to the function 60 representing the correlation between the total value of the fuel flow rates $F_A$ and $F_B$ and the segment movement delay time $T_{D1}$ in the first segment.

The temperature correction coefficient obtained by applying the temperature T1 (that is, the temperature T1 acquired by the temperature sensor 36) of the fuel gas in the first segment of the fuel line 12 to the temperature correction function 62 is input to the multiplier 64, and the multiplier 64 calculates the product of the segment movement delay time $T_{D1}$ and the temperature correction coefficient. That is, in the multiplier 64, the segment movement delay time $T_{D1}$ is corrected with the temperature T1 of the fuel gas in the first segment. The calculation result in the multiplier 64 is input to a multiplier 68.

The pressure correction coefficient obtained by applying the pressure P1 (that is, the pressure P1 acquired by the pressure sensor 34) of the fuel gas in the first segment of the fuel line 12 to the pressure correction function 66 is input to the multiplier 68, and the multiplier 68 calculates the product of the calculation result in the multiplier 64 and the pressure correction coefficient. That is, in the multiplier 68, the segment movement delay time $T_{D1}$ is corrected with the pressure P1 of the fuel gas in the first segment. The calculation result in the multiplier 68 is the segment movement delay time $T_{D1}*$ corrected with the temperature T1 and the pressure P1 of the fuel gas in the first segment.

Further, in the segment movement delay time calculation unit 52, the segment movement delay time $T_{D2}$ in the second segment (branch line 18A) of the fuel line 12, which corresponds to the fuel flow rate $F_A$ (the command value of the fuel flow rate given to the fuel valve 8) acquired from the control apparatus 90 etc., is calculated by applying the acquired fuel flow rate $F_A$ to the function 70 representing the correlation between the fuel flow rate $F_A$ and the segment movement delay time $T_{D2}$ in the second segment.

The temperature correction coefficient obtained by applying the temperature T2 (that is, the temperature T2 acquired by the temperature sensor 40) of the fuel gas in the second segment of the fuel line 12 to the temperature correction function 72 is input to the multiplier 74, and the multiplier 74 calculates the product of the segment movement delay time $T_{D2}$ and the temperature correction coefficient. That is, in the multiplier 74, the segment movement delay time $T_{D2}$ is corrected with the temperature T2 of the fuel gas in the second segment. The calculation result in the multiplier 74 is input to the multiplier 78.

The pressure correction coefficient obtained by applying the pressure P2 (that is, the pressure P2 acquired by the pressure sensor 38) of the fuel gas in the second segment of the fuel line 12 to the pressure correction function 76 is input to the multiplier 78, and the multiplier 78 calculates the product of the calculation result in the multiplier 74 and the pressure correction coefficient. That is, in the multiplier 78, the segment movement delay time $T_{D2}$ is corrected with the pressure P2 of the fuel gas in the second segment. The calculation result in the multiplier 78 is the segment movement delay time $T_{D2}*$ corrected with the temperature T2 and the pressure P2 of the fuel gas in the second segment.

The segment movement delay time $T_{D1}*$ of the first segment and the segment movement delay time $T_{D2}*$ of the second segment calculated by the segment movement delay time calculation unit 52 as described above are input to the adder 80, and the both are added up in the adder 80 to calculate the total movement delay time Ttotal. The calculated total movement delay time Ttotal is input to the multiplier 84.

The density correction coefficient obtained by applying the density of the fuel gas, which is obtained from the density meter 32, to the density correction function 82 is input to the multiplier 84, and the multiplier 84 calculates the product of the total movement delay time Ttotal and the density correction coefficient. That is, the multiplier 84 calculates the total movement delay time Ttotal* obtained by correcting the total movement delay time Ttotal with the density of the fuel gas. The calculated (that is, corrected) total movement delay time Ttotal* is input to the subtracter 86.

The calorimeter detection delay $T_M$ acquired from the storage unit etc. is input to the subtracter 86, and the subtracter 86 subtracts the calorimeter detection delay $T_M$ from the total movement delay time Ttotal*, calculating the delay time $T_{NET}$ indicating the time difference between when the calorie of the fuel gas is measured by the calorimeter 30 and when the fuel gas reaches the supply target device (combustor 4).

The delay time $T_{NET}$ thus calculated may be input to the above-described control unit 92 and used to generate the control signal for controlling the gas turbine 10.

In the embodiment described above, the fuel line 12 between the measurement point $P_M$ and the supply target device (combustor 4, 4A) is divided into the two segments, that is, the first segment and the second segment. However, the method for dividing the fuel line 12 is not limited to this. For example, the fuel line 12 between the measurement point $P_M$ and the supply target device may be divided into at least three segments.

For example, in the case of the facility 100 having the configuration shown in FIG. 2, the fuel line 12 between the measurement point $P_M$ and the supply target device (combustor 4A) may be divided into three segments including the first segment between the measurement point $P_M$ and the branch point $P_B$, the second segment between the branch point $P_B$ and the heater 20A, and the third segment between the heater 20A and the combustor 4A.

The delay time (including the segment movement delay time or the total movement delay time) can more accurately be calculated by dividing the fuel line 12 into more segments, and calculating the segment movement delay time for each segment or correcting each segment movement delay time with the temperature or the pressure in each segment.

The contents described in the above embodiments would be understood as follows, for instance.

(1) A delay time calculation method according to at least one embodiment of the present invention is a method for calculating a delay time in a facility (100) including a fuel line (12) for introducing a fuel gas to a supply target device (such as the above-described combustor 4), and a calorimeter (30) for measuring a calorie of the fuel gas obtained from a measurement point ($P_M$) of the fuel line, the delay time indicating a time difference between when the calorie of the fuel gas is measured by the calorimeter and when the fuel gas reaches the supply target device, the fuel line including a plurality of segments (such as the above-described first segment and second segment) obtained by dividing the fuel line between the measurement point and the supply target device, the delay time calculation method including: a step of calculating a plurality of segment movement delay times ($T_D$) respectively indicating times required for the fuel gas to pass through the plurality of segments; a step of calculating a total movement delay time (Ttotal) which is a time required for the fuel gas to move through the fuel line from the measurement point to the supply target device, by adding up the plurality of segment movement delay times; and a step of acquiring the delay time based on the total movement delay time. The step of calculating the plurality of segment movement delay times includes acquiring the segment movement delay time based on a correlation between the segment movement delay time acquired in advance and a fuel flow rate supplied to the supply target device, for each of the plurality of segments.

In the above method (1), the fuel line is divided into the plurality of segments, and for each of the plurality of segments, the segment movement delay time according to the fuel flow rate supplied to the supply target device can appropriately be calculated based on the correlation between the fuel flow rate and the movement delay time (segment movement delay time) of the fuel gas. Further, in the above method (1), since the fuel line is divided into the plurality of segments and the movement delay time (segment movement delay time) of the fuel gas is calculated for each of the plurality of segments, it is possible to respectively calculate the plurality of segment movement delay times by taking into account conditions which are different depending on the segments. Therefore, the total movement delay time required for the fuel gas to move through the fuel line from the calorie measurement point to the supply target device can accurately be calculated by adding up the plurality of segment movement delay times thus obtained. Accordingly, the facility (gas turbine etc.) including the supply target device can more appropriately be controlled by using the delay time based on the total movement delay time.

(2) In some embodiments, in the above method (1), the delay time calculation method includes: a step of correcting at least one of the plurality of calculated segment movement delay times with a temperature or a pressure of the fuel gas in the segment. The step of calculating the total movement delay time includes calculating the total movement delay time by using the segment movement delay time ($T_D*$) corrected in the step of correcting.

The temperature or the pressure of the fuel gas may vary depending on the section of the fuel line. Further, the correlation between the fuel flow rate and the movement delay time of the fuel gas is influenced by the temperature or the pressure of the fuel gas. In this regard, with the above method (2), since the segment movement delay time calculated based on the above-described correlation is corrected with the temperature or the pressure of the fuel gas in the segment, and the total movement delay time is calculated using the segment movement delay time thus corrected, it is possible to accurately calculate the total movement delay time. Accordingly, the facility including the supply target device can more appropriately be controlled by using the delay time based on the total movement delay time.

(3) In some embodiments, in the above method (1) or (2), the facility includes a heater (20) disposed in the fuel line and configured to heat the fuel gas, and the plurality of segments include a segment (such as the above-described first segment) including a section of the fuel line, which is located upstream of the heater, and a segment (such as the above-described second segment) including a section of the fuel line, which is located downstream of the heater.

With the above method (3), since the fuel line is divided into the segment located upstream of the heater and including a section where the temperature of the fuel gas is relatively low, and a segment located downstream of the heater and including the section where the temperature of the fuel gas is relatively high, it is possible to respectively calculate the plurality of segment movement delay times by taking into account the conditions (for example, the temperature) which are different depending on these segments. For example, the segment movement delay time calculated based on the above-described correlation for each segment can be corrected with the temperature of the fuel gas in the segment. Therefore, the total movement delay time can accurately be calculated by adding up the plurality of segment movement delay times thus obtained. Accordingly, the facility including the supply target device can more appropriately be controlled by using the delay time based on the total movement delay time.

(4) In some embodiments, in any of the above methods (1) to (3), the facility includes a plurality of the supply target devices (such as the above-described combustors 4A, 4B) where the fuel gas is supplied, the fuel line includes a plurality of branch lines (18A, 18B) for respectively introducing the fuel gas to the plurality of supply target devices, the measurement point is located upstream of a branch point ($P_B$) where the plurality of branch lines branch, in the fuel line, and the step of calculating the plurality of segment movement delay times includes acquiring the segment movement delay time based on a correlation between the segment movement delay time acquired in advance and a total value of fuel flow rates supplied to the plurality of supply target devices, for a segment (such as the above-described first segment) upstream of the branch point in the fuel line.

With the above method (4), the segment movement delay time is acquired based on the correlation between the segment movement delay time and the total value of the fuel flow rates supplied to the plurality of supply target devices, for the segment, of the fuel line, including the section upstream of the branch point where the branch line branches which is configured to introduce the fuel gas to the plurality of supply target devices. As described above, since the segment movement delay time is calculated even in consideration of the fuel flow rate of the supply target device other than the supply target device for which the total movement delay time is to be calculated, the total movement delay time can accurately be calculated by using the segment movement delay time. Accordingly, the facility including the supply target device can more appropriately be controlled by using the delay time based on the total movement delay time.

(5) In some embodiments, in any of the above methods (1) to (4), the delay time calculation method includes: a step of correcting at least one of the plurality of calculated segment movement delay times or the calculated total movement delay time with a density of the fuel gas.

The correlation between the fuel flow rate and the movement delay time of the fuel gas is influenced by the density of the fuel gas. In this regard, with the above method (5), since the segment movement delay time calculated based on the above-described correlation or the total movement delay time calculated from the segmental movement delay time is corrected with the density of the fuel gas, it is possible to accurately calculate the total movement delay time. Accordingly, the facility including the supply target device can more appropriately be controlled by using the delay time based on the total movement delay time.

(6) In some embodiments, in any of the above methods (1) to (5), the step of acquiring the delay time includes calculating the delay time by subtracting a time required to measure the calorie of the fuel gas with the calorimeter from the total movement delay time.

With the above method (6), since the time required to measure the calorie of fuel gas with the calorimeter (measurement delay time) is subtracted from the total movement time, the delay time can be calculated as a value closer to the time difference between when the calorie is measured with the calorimeter and when the fuel gas reaches the supply target device. Accordingly, the facility including the supply target device can more appropriately be controlled by using the delay time.

(7) A gas turbine control method according to at least one embodiment of the present invention, includes: a step of controlling a gas turbine (10) including a combustor (4) as the supply target device, by using the delay time calculated by the delay time calculation method according to any one of the above (1) to (6).

With the above method (7), since the gas turbine including the combustor as the supply target device is controlled by using the delay time based on the total movement delay time accurately calculated by the above method (1), the gas turbine can more appropriately be controlled.

(8) A delay time calculation apparatus (50) according to at least one embodiment of the present invention is a calculation apparatus for calculating a delay time in a facility (100) including a fuel line (12) for introducing a fuel gas to a supply target device (such as the above-described combustor 4), and a calorimeter (30) for measuring a calorie of the fuel gas obtained from a measurement point ($P_M$) of the fuel line, the delay time indicating a time difference between when the calorie of the fuel gas is measured by the calorimeter and when the fuel gas reaches the supply target device, the fuel line including a plurality of segments obtained by dividing the fuel line between the measurement point and the supply target device, the delay time calculation apparatus including: a segment movement delay time calculation unit (52) configured to calculate a plurality of segment movement delay times respectively indicating times required for the fuel gas to pass through the plurality of segments; a total movement delay time calculation unit (54) configured to calculate a total movement delay time by adding up the plurality of segment movement delay times; and a delay time acquisition unit (56) configured to acquire the delay time based on the total movement delay time. The segment movement delay time calculation unit is configured to acquire the segment movement delay time based on a correlation between the segment movement delay time acquired in advance and a fuel flow rate supplied to the supply target device, for each of the plurality of segments.

In the above configuration (8), the fuel line is divided into the plurality of segments, and for each of the plurality of segments, the segment movement delay time according to the fuel flow rate supplied to the supply target device can appropriately be calculated based on the correlation between the fuel flow rate and the movement delay time (segment movement delay time) of the fuel gas. Further, in the above configuration (8), since the fuel line is divided into the plurality of segments and the movement delay time (segment movement delay time) of the fuel gas is calculated for each of the plurality of segments, it is possible to respectively calculate the plurality of segment movement delay times by taking into account conditions which are different depending on the segments. Therefore, the total movement delay time required for the fuel gas to move through the fuel line from the calorie measurement point to the supply target device can accurately be calculated by adding up the plurality of segment movement delay times thus obtained. Accordingly, the facility (gas turbine etc.) including the supply target device can more appropriately be controlled by using the delay time based on the total movement delay time.

(9) A control apparatus (90) for a gas turbine according to at least one embodiment of the present invention, includes: the delay time calculation apparatus (50) as defined in the above (8); and a control unit (92) configured to control a gas turbine including a combustor as the supply target device, by using the delay time calculated by the delay time calculation apparatus.

With the above configuration (9), since the gas turbine including the combustor as the supply target device is controlled by using the delay time based on the total movement delay time accurately calculated by the above configuration (8), the gas turbine can more appropriately be controlled.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

The invention claimed is:

1. A method for calculating a delay time in a facility including a fuel line for introducing a fuel gas to a supply target device, and a calorimeter for measuring a calorie of the fuel gas obtained from a measurement point of the fuel line,
    the delay time indicating a time difference between when the calorie of the fuel gas is measured by the calorimeter and when the fuel gas reaches the supply target device,
    the fuel line including a plurality of segments obtained by dividing the fuel line between the measurement point and the supply target device,
    the delay time calculation method comprising:
    calculating a plurality of segment movement delay times, each segment movement delay time indicating a time required for the fuel gas to pass through a respective segment of the plurality of segments;
    calculating a total movement delay time which is a time required for the fuel gas to move through the fuel line from the measurement point to the supply target device, by adding up the plurality of segment movement delay times; and
    acquiring the delay time based on the total movement delay time,
    wherein the calculating of the plurality of segment movement delay times includes, for each respective segment of the plurality of segments, acquiring the segment movement delay time based on a correlation between the segment movement delay time and a fuel flow rate supplied to the supply target device, the correlation between the segment movement delay time and the fuel flow rate being acquired in advance, and
    wherein the acquiring of the delay time includes acquiring the total movement delay time as the delay time, or calculating the delay time by subtracting a time required to measure the calorie of the fuel gas with the calorimeter from the total movement delay time.

2. The method according to claim 1, further comprising:
    correcting a segment movement delay time of the plurality of calculated segment movement delay times with a temperature or a pressure of the fuel gas in the respective segment,
    wherein the calculating of the total movement delay time includes calculating the total movement delay time by using the corrected segment movement delay time.

3. The method according to claim 1,
    wherein the facility includes a heater disposed in the fuel line and configured to heat the fuel gas, and
    wherein the plurality of segments include a first segment including a section of the fuel line, which is located upstream of the heater relative to a flow direction of the fuel gas in the fuel line, and a second segment including a section of the fuel line, which is located downstream of the heater relative to the flow direction of the fuel gas.

4. The method according to claim 1,
    wherein the facility includes a plurality of the supply target devices where the fuel gas is supplied,
    wherein the fuel line includes a plurality of branch lines for respectively introducing the fuel gas to the plurality of supply target devices, the plurality of branch lines branching from a branch point in the fuel line,
    wherein the measurement point is located upstream of the branch point relative to a flow direction of the fuel gas in the fuel line, and wherein calculating of the plurality of segment movement delay times includes acquiring a segment movement delay time for a first segment of the plurality of segments based on a correlation between the segment movement delay time for the first segment and a total value of fuel flow rates supplied to the plurality of supply target devices, the first segment being upstream of the branch point in the fuel line, the correlation between the segment movement delay time for the first segment and the total value of fuel flow rates supplied to the plurality of supply target devices being acquired in advance.

5. The method according to claim 1, comprising:
correcting at least one of the plurality of calculated segment movement delay times or the calculated total movement delay time with a density of the fuel gas.

6. A gas turbine control method, comprising:
controlling a gas turbine including a combustor as the supply target device, by using the delay time calculated by the method according to claim 1.

7. A calculation apparatus for calculating a delay time in a facility including a fuel line for introducing a fuel gas to a supply target device, and a calorimeter for measuring a calorie of the fuel gas obtained from a measurement point of the fuel line,
the delay time indicating a time difference between when the calorie of the fuel gas is measured by the calorimeter and when the fuel gas reaches the supply target device,
the fuel line including a plurality of segments obtained by dividing the fuel line between the measurement point and the supply target device,
the calculation apparatus for calculating the delay time comprising:
a segment movement delay time calculation unit configured to calculate a plurality of segment movement delay times, each segment movement delay time indicating a time required for the fuel gas to pass through a respective segment of the plurality of segments;
a total movement delay time calculation unit configured to calculate a total movement delay time by adding up the plurality of segment movement delay times; and
a delay time acquisition unit configured to acquire the delay time based on the total movement delay time,
wherein the segment movement delay time calculation unit is configured to acquire, for each respective segment of the plurality of segments, the segment movement delay time based on a correlation between the segment movement delay time and a fuel flow rate supplied to the supply target device, the correlation between the segment movement delay time and the fuel flow rate being acquired in advance, and
wherein the delay time acquisition unit is configured to acquire the total movement delay time as the delay time, or to calculate the delay time by subtracting a time required to measure the calorie of the fuel gas with the calorimeter from the total movement delay time.

8. A control apparatus for a gas turbine, comprising:
the calculation apparatus for calculating the delay time according to claim 7; and
a control unit configured to control a gas turbine including a combustor as the supply target device, by using the delay time calculated by the calculation apparatus.

* * * * *